US012798984B2

(12) United States Patent
Baek et al.

(10) Patent No.: US 12,798,984 B2
(45) Date of Patent: Nov. 17, 2026

(54) MECHANOCHEMICAL AMMONIA SYNTHESIS METHOD

(71) Applicant: UNIST (ULSAN NATIONAL INSTITUTE OF SCIENCE AND TECHNOLOGY), Ulsan (KR)

(72) Inventors: Jong-Beom Baek, Ulsan (KR); Seok-Jin Kim, Ulsan (KR); Gao-Feng Han, Ulsan (KR)

(73) Assignee: UNIST (Ulsan National Institute of Science and Technology) (KR)

( * ) Notice: Subject to any disclaimer, the term of this patent is extended or adjusted under 35 U.S.C. 154(b) by 861 days.

(21) Appl. No.: 18/012,889

(22) PCT Filed: Dec. 24, 2020

(86) PCT No.: PCT/KR2020/019127

§ 371 (c)(1),
(2) Date: Dec. 23, 2022

(87) PCT Pub. No.: WO2022/004979

PCT Pub. Date: Jan. 6, 2022

(65) Prior Publication Data

US 2023/0257274 A1 Aug. 17, 2023

(30) Foreign Application Priority Data

Jun. 30, 2020 (KR) ........................ 10-2020-0080499

(51) Int. Cl.

| | |
|---|---|
| ***C01C 1/04*** | (2006.01) |
| ***B01J 23/745*** | (2006.01) |
| ***B01J 35/40*** | (2024.01) |
| ***B01J 35/45*** | (2024.01) |

(52) U.S. Cl.
CPC ........... *C01C 1/0405* (2013.01); *B01J 23/745* (2013.01); *B01J 35/40* (2024.01); *B01J 35/45* (2024.01)

(58) Field of Classification Search
CPC ....... C01C 1/0405; B01J 23/745; B01J 35/40; B01J 35/45; Y02P 20/52
See application file for complete search history.

(56) References Cited

U.S. PATENT DOCUMENTS 5,330,554 A * 7/1994 Koyano ................ B82Y 30/00 75/352
2014/0072499 A1 3/2014 Carpenter et al.

FOREIGN PATENT DOCUMENTS

CN 109835917 A * 6/2019
JP 2011213534 A 10/2011
JP 2020142189 A * 9/2020

(Continued)

OTHER PUBLICATIONS

Machine Translation, CN-109835917-A, Chen P, Jun. 4, 2019 (Year: 2019).*

(Continued)

*Primary Examiner* — Anthony J Zimmer
*Assistant Examiner* — Logan Laclair
(74) *Attorney, Agent, or Firm* — Klarquist Sparkman, LLP

(57) ABSTRACT

A mechanochemical ammonia synthesis method according to an embodiment includes: (a) ball-milling Fe particles with balls under a nitrogen ($N_2$) atmosphere; and (b) ball-milling the Fe particles ball-milled under the nitrogen ($N_2$) atmosphere, with balls under a hydrogen ($H_2$) atmosphere.

19 Claims, 15 Drawing Sheets

(56) References Cited

FOREIGN PATENT DOCUMENTS

| | | | |
|---|---|---|---|
| KR | 20200015209 | A | 2/2020 |
| WO | WO 2010/114936 | A1 | 10/2010 |

OTHER PUBLICATIONS

Machine Translation, JP-2020142189-A, Kataoka M, Sep. 10, 2020 (Year: 2020).*

International Stainless Steel Forum, "Basic facts about stainless steel" (Year: 2025).*

Gao et al., "Production of ammonia via a chemical looping process based on metal imides as nitrogen carriers," *Nature Energy*, Oct. 29, 2018, 3:1067-1075.

Han et al., "Mechanochemistry for ammonia synthesis under mild conditions," *Nature Nanotechnology*, published online Dec. 14, 2020, pp. 1-6.

Han et al., "Dissociating stable nitrogen molecules under mild conditions by cyclic strain engineering," *Science Advances*, Nov. 1, 2019, 5:eaax8275, 7 pages.

Huot et al., "Mechanochemical synthesis of hydrogen storage materials," *Progress in Materials Science*, 2013 (published online Jul. 27, 2012), 58:30-75.

Jacobsen et al., "Ammonia synthesis over multi-promoted iron catalysts obtained by high-energy ball-milling," *Catalysis Letters*, 1999, 61:115-120.

Lei et al., "Modification of wustite based ammonia synthesis catalyst with fine Fe particles," *Journal of Molecular Catalysis*, Jun. 2017, 31(3):206-214.

International Search Report and Written Opinion for PCT/KR2020/019127 dated Apr. 8, 2021, plus English translation of International Search Report, 13 pages.

Written Decision on Registration for related Korea Patent Application No. KR10-2020-0080499 dated Oct. 26, 2021, plus English translation of Written Decision, 7 pages.

* cited by examiner

MECHANOCHEMICAL AMMONIA SYNTHESIS METHOD

CROSS REFERENCE TO RELATED APPLICATIONS

This is the U.S. National Stage of International Application No. PCT/KR2020/019127, filed Dec. 24, 2020, which claims the benefit of Korean Application No. 10-2020-0080499, filed Jun. 30, 2020.

TECHNICAL FIELD

The present disclosure relates to an ammonia synthesis method.

BACKGROUND ART

Ammonia ($NH_3$) is one of the most important industrial materials in fertilizers, explosives, plastics and other chemicals. Around 140 million tons of ammonia were produced annually worldwide in 2019, making ammonia one of the world's top 10 chemicals. The latest ammonia synthesis method is the Haber-Bosch process that synthesizes ammonia from nitrogen ($N_2$) and hydrogen ($H_2$) at 400-500° C. and at 100 bar or more. The reaction of the Haber-Bosch process, $0.5N_2+1.5H_2 \leftrightarrow NH_3$ ($\Delta H=-46.22$ kJ $mol^{-1}$), is an exothermic reaction, and therefore in theory, according to Le Chatelier's principle, decreasing the temperature facilitates the conversion to $NH_3$. However, high dissociation energy of $N_2$ and strong adsorption energy of hydrogen inhibit the formation of ammonia, thus making the Haber-Bosch process unfeasible under ambient conditions. Therefore, for the thermodynamic equilibrium being in favor of $NH_3$ at low temperatures and the ease of low-temperature processing, the science community is constantly looking for ways to synthesize ammonia at milder conditions than the Haber-Bosch process. However, unfortunately, the ammonia synthesis today has the same basic structure as it did 100 years ago.

Thermodynamically considering the enthalpy of reaction, the activation energy for $N_2$ dissociation inevitably requires a high binding energy of the intermediates. The high temperature of the Haber-Bosch process used in industry is to promote the dissociation of stable $N_2$ molecules and the desorption of strongly adsorbed intermediates (N*, NH* and $NH_2$*), and to even further promote reactions, ultra high pressure is adopted from Le Chatelier's principle. Therefore, there is a need to find a way to break the Bell-Evans-Polanyi (BEP) relation to improve such high-energy ammonia synthesis conditions.

DISCLOSURE

Technical Problem

Provided is an ammonia synthesis method capable of improving high-temperature, high-pressure conditions of ammonia synthesis.

Technical Solution

A mechanochemical ammonia preparation method according to an embodiment includes the following steps:

(a) performing first ball-milling on Fe particles with balls in a nitrogen ($N_2$) atmosphere; and (b) performing second ball-milling on the first ball-milled Fe particles with balls in a hydrogen ($H_2$) atmosphere.

In the step (a), collision with the balls may create, on the Fe particles, active defects providing sites for nitrogen ($N_2$) adsorption and dissociation into nitrogen atoms (N*).

In the step (a), Fe(N*) particles having nitrogen atoms adsorbed at the active defects may be formed.

The nitrogen atoms (N*) adsorbed on the Fe particles in the step (a) may be hydrogenated in the step (b) to produce NH* or $NH_2$* intermediates, or ammonia ($NH_3$).

The step (b) may be repeated until all of the intermediates are converted to ammonia.

By the ball-milling process, the density of the active defects on the Fe particles may increase.

The step (a) may be conducted at a temperature in a range of 20° C. to 100° C.

The step (a) may be conducted at a pressure in a range of 1 bar to 20 bars.

Between the step (a) and the step (b), a step of converting the nitrogen ($N_2$) atmosphere to the hydrogen ($H_2$) atmosphere may be further included.

In the step (a), the ball milling may be conducted at a rotation speed in a range of 200 rpm to 1,000 rpm.

The step (b) may be conducted at a temperature in a range of 40° C. to 100° C.

The step (b) may be conducted at a pressure in a range of 1 bar to 20 bars.

In the step (b), the ball milling may be conducted at a rotation speed in a range of 200 rpm to 1,000 rpm.

The balls may be Fe-containing balls.

The Fe-containing balls may be Fe balls made of Fe.

In the step (a), the Fe particles may have a diameter in a range of 10 nm to 1 mm, for example, 10 nm to 100 μm.

In the step (b), the Fe(N*) particles may have a diameter in a range of 5 nm to 500 μm, for example, in a range of 5 nm to 50 μm, which is smaller than the diameter of the Fe particles used.

After the step (b), step (c) of separating ammonia produced may be further included.

After the step (c), the Fe particles may grow to larger particles through Ostwald ripening.

By reusing the Fe particles regenerated after the step (C), the step (a) and the step (b) may be repeated.

Advantageous Effects

By a mechanochemical method through ball-milling using Fe particles, ammonia may be synthesized under mild conditions of a low temperature and a low pressure.

MODE FOR INVENTION

Hereinbelow, an ammonia synthesis method using a mechanochemical method according to an embodiment will be described in greater detail.

(Ammonia Synthesis Mechanism)

Figure 1:
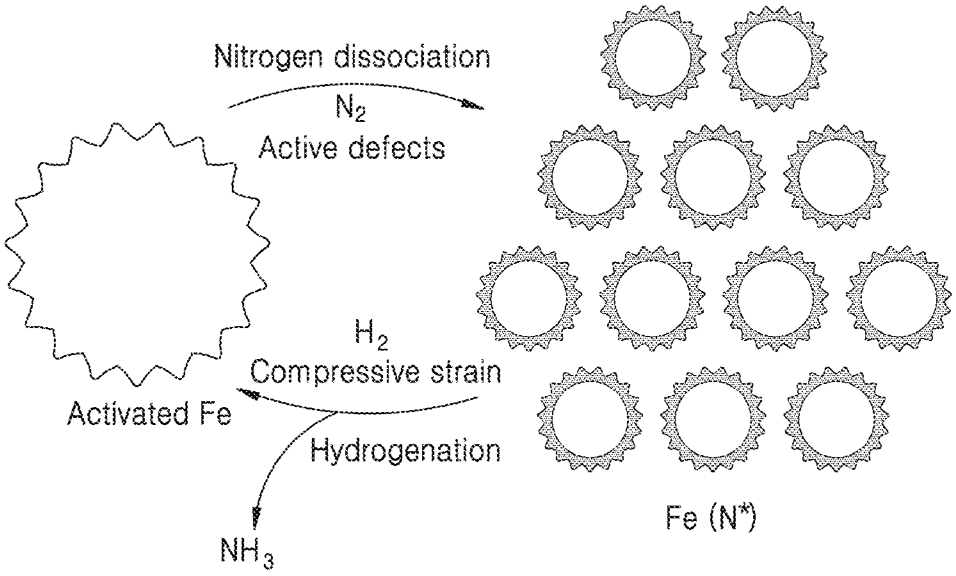
FIG. 1 is a diagram schematically illustrating an ammonia synthesis mechanism using a mechanochemical method according to an embodiment.

FIG. 1 is a diagram schematically illustrating an ammonia synthesis mechanism using a mechanochemical method according to an embodiment. Referring to FIG. 1, the ammonia synthesis mechanism according to an embodiment includes two steps, namely nitrogen dissociation and hydrogenation.

Nitrogen Dissociation

During the milling process under a nitrogen atmosphere, defects are created on the surfaces of Fe particles by repeated collisions with milling balls. These defects are active defects that provide sites at which nitrogen ($N_2$) can be adsorbed and dissociated into nitrogen atoms (N*). The Fe particles, through collisions, are cracked into smaller Fe particles, thus increasing the total surface area of the particles. The increased surface area of the Fe particles allows the Fe particles to create more active defects and subsequently be more advantageous for adsorption of a greater amount of nitrogen ($N_2$).

Stable nitrogen ($N_2$) are adsorbed to the active defects of the Fe particles and dissociate into nitrogen atoms (N*). The active defects created from repeated collisions with Fe balls during a ball milling process may extremely effectively encourage nitrogen dissociation. Fe atoms (active Fe atoms) positioned on the active defects provide an empty space for binding to nitrogen atoms. Such a space imparts a polarity to nitrogen bonds and bias the stable nitrogen bond to one side, and thus may contribute to decreasing the activation energy for nitrogen dissociation. In addition, as the density of active defects on the surface of the Fe particles increases through the ball milling, a larger amount of nitrogen atoms (N*) may be adsorbed on the Fe particles. Meanwhile, if the concentration of nitrogen atoms (N*) within the Fe particles increases, the number of adsorbed Fe—N bonds increases, and a decreasing distance between Fe—N bonds creates a repulsion effect between the Fe—N bonds, thus weakening the Fe—N bonding. The weakening of the Fe—N bonding may further facilitate the N—H bonding for ammonia synthesis.

Hydrogenation Step

Nitrogen atoms (N*) adsorbed on Fe particles, are hydrogenated to NH*, $NH_2$*, or $NH_3$ through reactions with hydrogen ($H_2$) under a hydrogen ($H_2$) atmosphere (NH* and $NH_2$* represent radicals). NH*, $NH_2$* or $NH_3$ strongly adsorbed on the surface of the Fe particles may be desorbed from the Fe surface by compressive strain due to impacts by ball milling. As $NH_3$ products are released from the Fe particles, the Fe particles may grow to larger sizes by Ostwald ripening.

Hereinbelow, a mechanochemical ammonia synthesis method according to an embodiment will be described in greater detail.

As described above, the mechanochemical ammonia synthesis method according an embodiment includes a step (a) of dissociating nitrogen gas ($N_2$) into nitrogen atoms (N*), and a step (b) of hydrogenating the dissociated atoms (N*) to ammonia.

In the step (a), by ball-milling Fe particles with balls under a nitrogen ($N_2$) atmosphere, nitrogen ($N_2$) is adsorbed on the Fe particles, and is dissociated into nitrogen atoms (N*). During the ball-milling process, active defects are created on the Fe particles by collisions with the balls. Nitrogen ($N_2$) may be adsorbed on these active defects and then dissociated into nitrogen atoms (N*). Accordingly, Fe(N*) particles, on which the nitrogen atoms (N*) dissociated in the step (a) are adsorbed, may be formed. The ball-milling process may cause cracking of the Fe particles to form a greater number of Fe particles, or may increase the density of active defects on the Fe particles, thus increasing adsorption of nitrogen ($N_2$), and dissociation thereof into nitrogen atoms (N*).

The ball-milling process in the step (a) may be conducted at room temperature. The temperature inside a ball-milling container increases proportionally with the rotation speed of the ball-milling container. Due to the rotation of the ball-milling container, the average temperature inside the ball-milling container may be increased from room temperature up to about 100° C. The rotation speed of the ball-milling container may be, for example, in a range of 200 rpm to 1,000 rpm. The ball-milling process in the step (a) may be conducted at a pressure in a range of 1 bar to 20 bars, for example.

Meanwhile, the balls used in the ball-milling process may be balls containing a Fe component. In particular, the balls may be balls made of Fe. The balls may have a diameter in a range of 2 mm to 30 mm, for example. When the balls have a diameter in the above ranges, collisions with the Fe particles may effectively create active defects on the Fe particles during a ball-milling process. The Fe particles are particles made of Fe, and may have a diameter in a range of 10 nm to 1 mm, for example, in a range of 10 nm to 100 μm, and in the step (a), the particles having a diameter in the aforementioned ranges may be introduced and used.

To hydrogenate the nitrogen atoms (N*) dissociated in the step (a) to ammonia in the step (b), the nitrogen ($N_2$) atmosphere inside the ball-milling container is transformed to a hydrogen ($H_2$) atmosphere.

The ball-milling process in the step (b) may be conducted at room temperature. Due to the rotation of the ball-milling container, the average temperature inside the ball-milling container may increase up to about 100° C. The ball-milling container in the step (b) may have an initial temperature higher than room temperature due to heat generated by the ball milling previously conducted in the step (a). A temperature inside a ball-milling container increases proportionally with a rotation speed of the ball-milling container. The rotation speed of the ball-milling container may be in a range of 200 rpm to 1,000 rpm. The ball-milling process in the step (a) may be conducted at a pressure in a range of 1 bar to 20 bar.

In the step (b), under a hydrogen ($H_2$) atmosphere, N* atoms adsorbed on the Fe particles may react with hydrogen ($H_2$) to produce NH* or $NH_2$* intermediates, or ammonia ($NH_3$). The step (b) may be repeated until all of the NH* or $NH_2$* intermediates are converted to ammonia. In the step (b), the Fe(N*) particles, which have nitrogen atoms (N*) adsorbed thereon, may have a diameter smaller than the diameter of the Fe particles in the step (a). Here, the Fe(N*) particles may have a diameter in a range of 5 nm to 500 μm, for example, in a range of 5 nm to 50 μm.

Step (c) of separating ammonia produced after the step (b) may be further included. Separation of ammonia may be carried out by methods such as adiabatic expansion, ammonium salt formation reaction, liquefaction, and the like. Once ammonia is separated, the Fe particles may grow to larger particles by Ostwald ripening. In particular, once ammonia is separated, the Fe particles, which were cracked into smaller particles by ball milling, may grow back to larger particles and be reused for ball milling. Accordingly, the Fe particles having undergone the step (a) and the step (b), may be repeatedly reused in the step (a) and the step (b).

EXPERIMENTAL EXAMPLES

Nitrogen Dissociation and Fixation

In a glove box under Ar (99.999%, KOSEM Corp., Korea) atmosphere, Fe particles [24 g, diameter <10 μm, 99.9% Fe, Alfa Aesar, Catalogue No: 00170] and Fe balls (diameter=5 mm, 99 wt % Fe, 500 g of hardened steels) were loaded into a ball-milling container (250 mL). Operating under the glove box is to prevent Fe oxidation (rusting) by preventing Fe particles from coming in contact with air. Subsequently, the ball-milling container filled with the Fe particles and the Fe balls was taken out of the glove box, and the Ar gas inside the ball-milling container was replaced with $N_2$ gas. Before connecting to $N_2$ gas, the gas line was completely cleaned out with $N_2$ gas, and to remove residual Ar gas inside the ball-milling container, the ball-milling container was purged by injecting/venting out $N_2$ gas (99.999%, KOSEM Corp., Korea) at least 5 times using a vacuum pump. The pressure of $N_2$ gas inside the ball-milling container was 9 bar, and the gas pressure was measured by a pressure gauge (Model 801, Harris Calorific Co, USA). Since $O_2$ adversely affects nitrogen dissociation, it is important to avoid $O_2$ contamination.

Meanwhile, since low temperatures facilitate nitrogen fixation on Fe particles, which is an exothermic process, a cooling fan was used to increase the speed of mechanical cooling. In addition, for every 30 minutes of ball-milling, the ball-milling was stopped for 10 minutes to release heat. As such, nitrogen atoms (N*) were fixed on the surface of Fe particles by dissociating $N_2$ gas, and the Fe particles having nitrogen atoms (N*) fixed thereon are referred to as Fe(N*) particles.

Ammonia Synthesis

To synthesize ammonia by hydrogenating the prepared Fe(N*) particles, residual $N_2$ gas inside the ball-milling container was replaced with $H_2$ gas (99.999%, Daesung Industrial Gases Co., Ltd.). The method by which the $N_2$ gas is replaced with the $H_2$ gas is the same as the method of replacing Ar gas with $N_2$ gas described above. The pressure of $H_2$ gas charged in the ball-milling container was 9 bar. (Safety note: After the hydrogenation, caution should be exercised particularly when collecting Fe particles due to oxidation of activated surface after exposure to air, considering residual $H_2$ gas in the container. It is recommended to collect Fe particles from within the glove box after the hydrogenation, but before transferring to the glove box, residual gas mixtures ($NH_3$ and $H_2$) inside the container should be completely removed.)

Since the process of hydrogenation of Fe(N*) particles, unlike nitrogen dissociation, is an endothermic process which can be facilitated by a high temperature, the use of a cooling fan described above was stopped. In addition, after every 60 minutes of continuous ball-milling, cooling for 10 minutes was performed. To completely remove the adsorbed nitrogen atoms (N*), the hydrogenation process for Fe(N*) was performed on multiple times. The ball-milling time for each hydrogenation process was 4 hours. In the first cycle of hydrogenation process, about 60% of adsorbed nitrogen atoms (N*) was hydrogenated to ammonia.

Nitrogen Dissociation and Ball-Milling Parameters

Experimental Examples 1 to 6: Influence of Rotation Speed of Ball-Milling Container on Nitrogen ($N_2$) Adsorption The container temperature is dominated by heat generated by mechanical collisions with the balls due to rotation of the container during a ball-milling process. Therefore, the container temperature may be controlled by controlling the rotation speed of the container. The container temperature was measured by an infrared thermometer. To ensure the identical test conditions, the ball-milling container was set to the same cycle number of 240,000 in all tests.

The rotation speeds of the ball-milling container were selected to be 250, 300, 350, 400, 450 and 500 rpm, and the corresponding ball-milling times were 16.0, 13.3, 11.4, 10, 8.9, and 8.0 hours, respectively (Experimental Examples 1 to 6). Throughout Experimental Examples 1 to 6, the same Fe particles were repeatedly used. The volume of nitrogen ($N_2$) adsorbed on the Fe particles was calculated by measuring the total amount of ammonia produced after complete hydrogenation of Fe(N*) particles.

Figure 2:
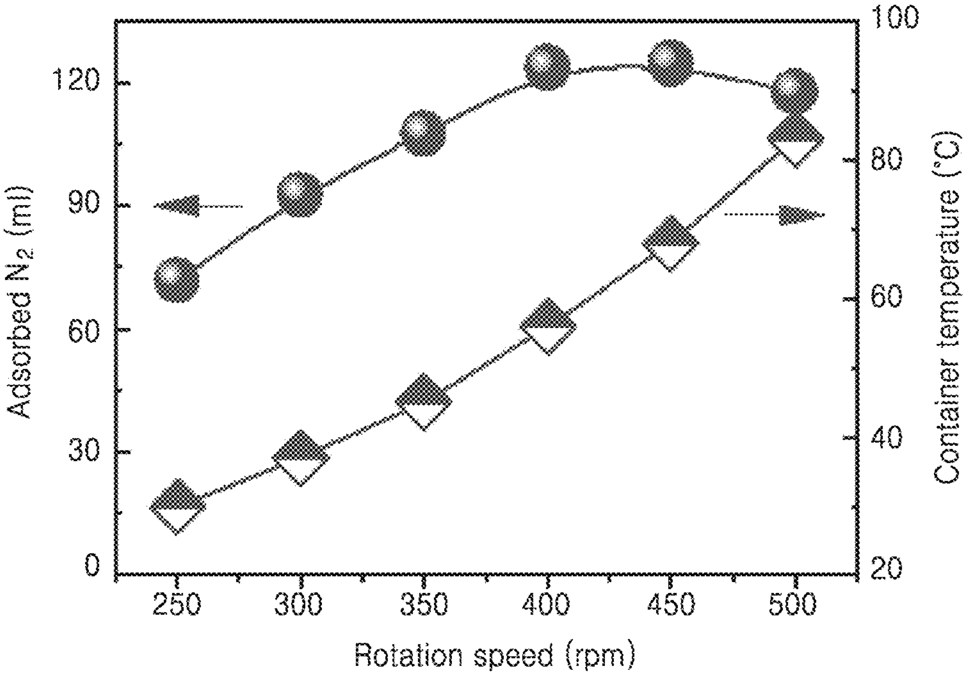
FIG. 2 is a graph of container temperature and adsorbed ammonia volume as a function of rotation speed of a ball-milling container as measured in Experimental Examples 1 to 6.

FIG. 2 is a graph showing the total volume of nitrogen ($N_2$) adsorbed on Fe particles in the ball-milling container and the temperature of the ball-milling container as a function of rotation speed of the ball-milling container as measured in Experimental Examples 1 to 6. The graph in FIG. 2 shows that as the rotation speed of the ball-milling container increases, the temperature of the ball-milling container increases. Furthermore, the graph in FIG. 2 also shows that the volume of the adsorbed nitrogen ($N_2$) increases proportionally with the rotation speed of the ball-milling container, and after reaching its peak at 400 rpm, starts to decrease. The curve of the graph in FIG. 2 shows a typical volcano plot, and this indicates that the $N_2$ adsorption process is dominated by a pair of competitive variants. These competing factors are considered to be kinetic energy of the balls and the Fe particles generated by mechanical collisions, and thermal energy. The kinetic energy of the Fe particles and the balls may induce nitrogen dissociation by creating defects on the Fe particles and providing the sites for nitrogen adsorption. On the other hand, the thermal energy shown as the temperature of the ball-milling container may adversely affect nitrogen ($N_2$) adsorption since the nitrogen ($N_2$) adsorbed on the Fe particles, due to high entropy, may be easily released at a high temperature. In the graph in FIG. 2, the optimal rotation speed that shows a balance between kinetic energy and thermal energy and thus maximizes $N_2$ adsorption was found to be 400 rpm.

Experimental Examples 7 to 11: Influence of Ball-Milling Time on Nitrogen ($N_2$) Adsorption The Fe particles in Experimental Examples 7 to 11 were ball-milled at a rotation speed of 500 rpm under a nitrogen ($N_2$) gas (9 bar) atmosphere. The ball-milling times selected were 4, 8, 16, 30, and 50 hours. Experimental Examples 7 to 11 each used new Fe particles. The volume of nitrogen ($N_2$) adsorbed on the Fe particles was determined by measuring the total amount of ammonia produced after complete hydrogenation of Fe(N*) particles produced in Experimental Examples 7 to 11.

Figure 3:
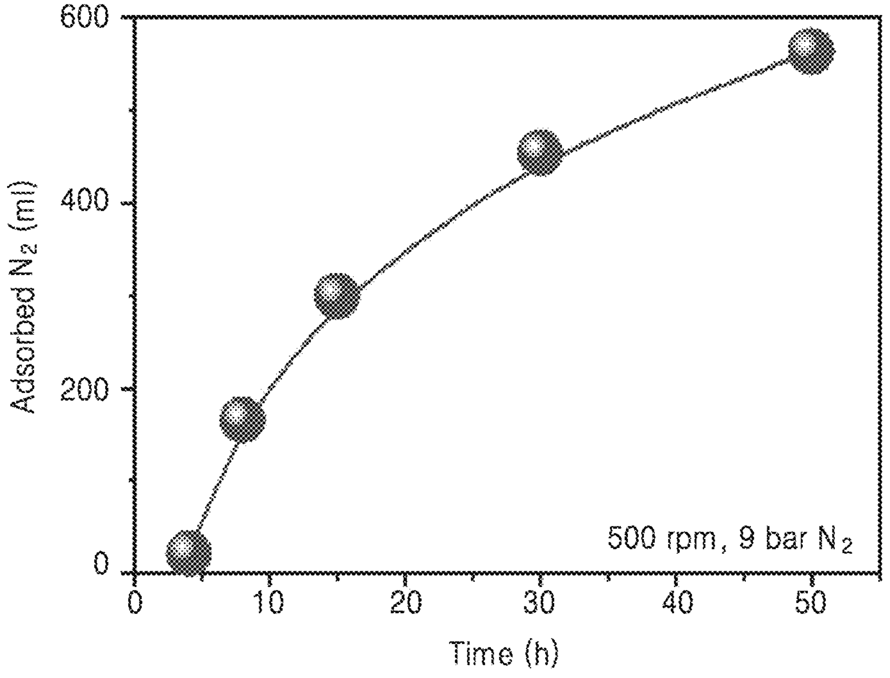
FIG. 3 shows a graph of $N_2$ volume versus ball-milling time as measured in Experimental Examples 7 to 11.
Figure 4:
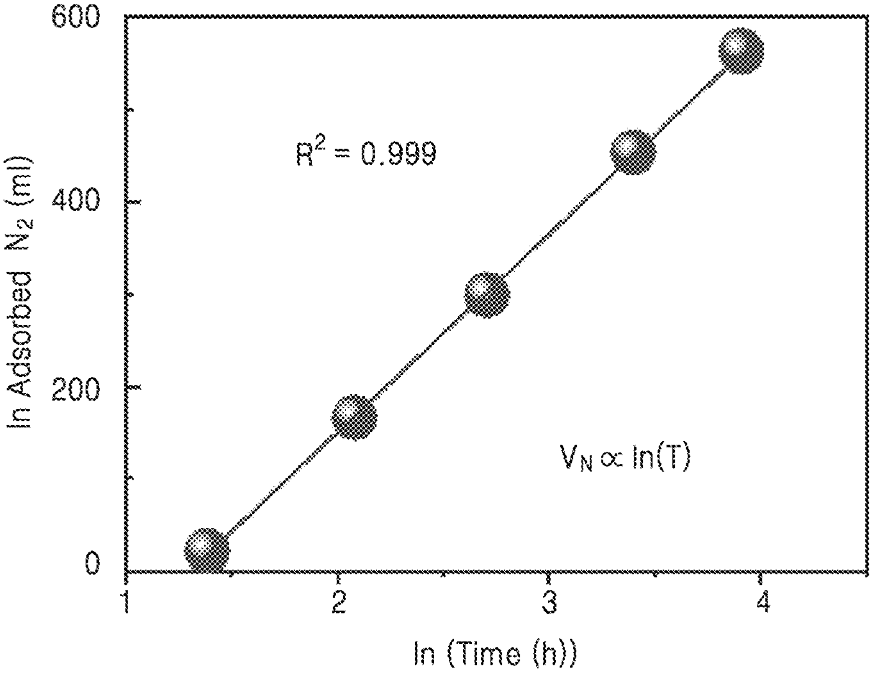
FIG. 4 is a natural log graph of ball-milling time versus $N_2$ volume as measured in Experimental Examples 7 to 11.

FIG. 3 is a graph of the volume of adsorbed nitrogen ($N_2$) as a function of ball-milling time in Experimental Examples 7 to 11, and FIG. 4 is a graph showing a linear relation by expressing the time in FIG. 3 as a natural logarithm.

Referring to the graphs of FIGS. 3 and 4, the volume of adsorbed $N_2$ was found to increase with the ball-milling time, and the volume of adsorbed $N_2$ was found to be proportional to the natural logarithm of the ball-milling time. From here, it seems that when the Fe particles are first used, an initial activation period for $N_2$ adsorption was required. That is, it is deemed that, for Fe particles to be able to act as a catalyst for nitrogen ($N_2$) dissociation, the Fe particles first need to be ground and have their surface activated. Here, the activation means that the Fe particles have active defects created thereon and thus become capable of allowing adsorption of nitrogen ($N_2$) in a Fe—N* form.

Hydrogenation and Ball-Milling Parameters

To measure the ammonia produced, the mass and concentration of ammonium salts produced by connecting the gas mixture produced in the hydrogenation step with a 0.3 M HCl solution were measured.

Ammonia Measurement

The Ammonia Concentration in the Gas Mixture Produced was Measured Using gas chromatography (GC, 7890B, Agilent) equipped with a column (10 Ft ⅛ 2 mm HayeSep Q 80/100 μm). In addition, the following two methods were further used for ammonia quantification.

The produced gas mixture was injected into a bottle having a porous filter and filled with a 0.3 M aqueous HCl solution (100 mL), to thereby convert ammonia in the gas mixture to ammonium chloride. Solution (20 mL) in the bottle was collected to measure the concentration of ammonium chloride by ion chromatography (IC, Thermo Scientific, Dionex ICS-1600). Meanwhile, the remaining solution (80 mL) inside the bottle was evaporated by a rotary evaporator, and after further drying in a vacuum furnace at 75° C. for 10 hours, the weight of solidified ammonium chloride was measured. The concentration of ammonia obtained by ion chromatography, and the concentration of ammonia obtained from the weight of dried ammonium chloride were well-matched to each other. Namely, each ammonia concentrations obtained by the two method were proportional to the amount of the solution taken each.

Experimental Examples 12 to 15: Influence of Ball-Milling Rotation Speed on Hydrogenation Fe(N*) particles were prepared by ball-milling Fe particles under $N_2$ (9 bar) at a rotation speed of 400 rpm for 10 hours.

The prepared Fe(N*) particles were hydrogenated by ball-milling under $H_2$ (9 bar) at a rotation speed of 350, 400, 450, and 500 rpm, for 5.7, 5.0, 4.4, and 4.0 hours, respectively, to produce ammonia (Experimental Examples 12 to 15). In the hydrogenation step, the total number of rotation was 120,000 cycles. Throughout Experimental Examples 21 to 24, the same Fe particles were repeatedly used.

Figure 5:
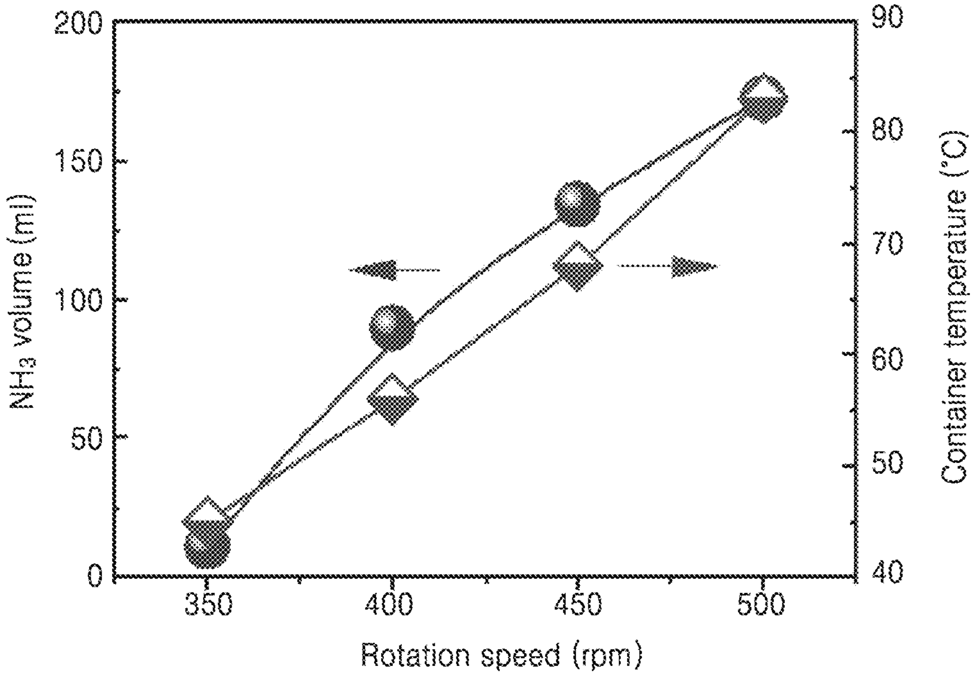
FIG. 5 shows a graph of ball-milling container temperature and ammonia volume as a function of rotation speed of a ball-milling container as measured in Experimental Examples 12 to 15.

FIG. 5 is a graph of ball-milling container temperature and ammonia volume as a function of rotation speed of the ball-milling container as measured in Experimental Examples 12 to 15.

Referring to the graph in FIG. 5, it was found that the volume of ammonia produced increases as the rotation speed of the ball-milling container increases. Since the hydrogenation step is an endothermic process, as the temperature increases with an increase in the rotation speed of the ball-milling container, the volume of ammonia produced increases.

Experimental Examples 16 to 20: Influence of Ball-Milling Time on Hydrogenation

Fe(N*) particles were prepared by ball-milling Fe particles under $N_2$ (9 bar) at a rotation speed of 500 rpm for 30 hours.

The prepared Fe(N*) particles were hydrogenated by ball-milling under $H_2$ (9 bar) at a rotation speed of 500 rpm for 4, 8, 12, 16, and 20 hours, respectively, to produce ammonia (Experimental Examples 16 to 20).

Figure 6:
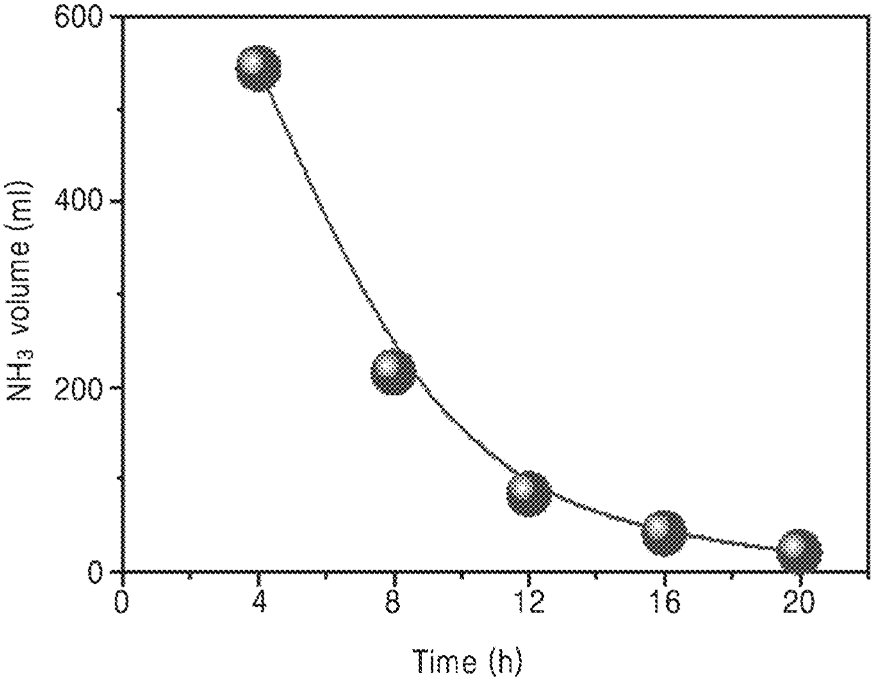
FIG. 6 shows a graph of ammonia volume versus ball-milling time as measured in Experimental Examples 16 to 20.
Figure 7:
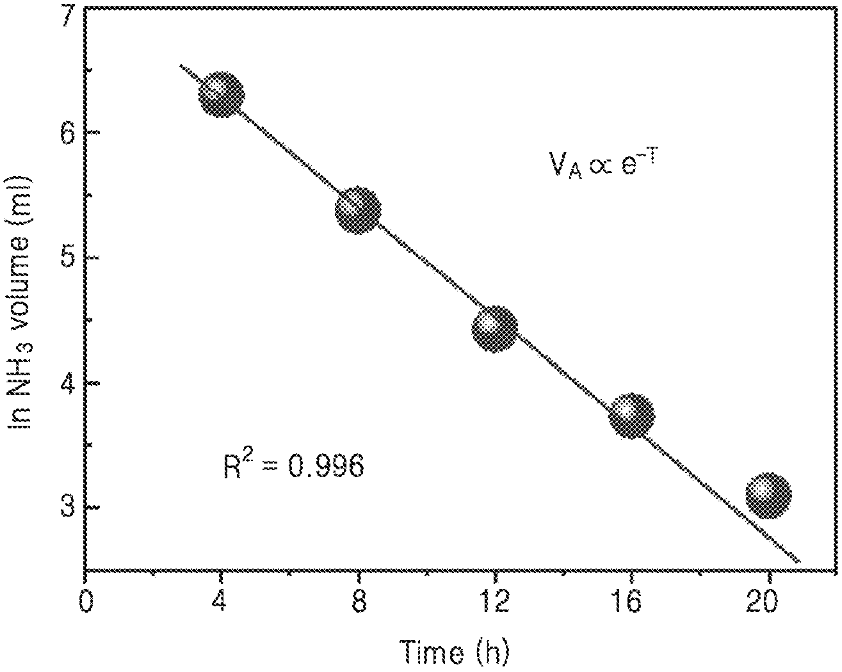
FIG. 7 shows a graph of natural log of ammonia volume versus ball-milling time as measured in Experimental Examples 16 to 20.

FIG. 6 is a graph of ammonia volume versus ball-milling time, as measured at a 4-hour interval in Experimental Examples 16 to 20. FIG. 7 is a graph of ball-milling time versus natural logarithm of ammonia volume, as measured in Experimental Examples 16 to 20. In FIG. 6 and FIG. 7, the $NH_3$ volume at a certain time point is the volume of $NH_3$ produced from 4 hours prior to said specific time point. For example, the $NH_3$ volume at 4 h is the volume of $NH_3$ produced from 0 h to 4 h, and the $NH_3$ volume is the volume of $NH_3$ produced from 4 h to 8 h. Referring to the graphs of FIG. 6 and FIG. 7, it was found that the volume of ammonia produced exponentially decreases as the ball-milling time increases. This is attributed to a decrease in the concentrations of reactants as Fe(N*) participates in ammonia production.

Experimental Examples 21 to 28: Influence of $H_2$ Pressure on Hydrogenation

Fe(N*) particles were prepared by ball-milling Fe particles under $N_2$ (9 bar) at a rotation speed of 400 rpm for 37.5 hours. The prepared Fe(N*) particles were hydrogenated by ball-milling at a rotation speed of 500 rpm for 4 hours at a $H_2$ pressure of 2, 3, 4, 5, 6, 7, 8, and 9 bars, respectively, to produce ammonia (Experimental Examples 21 to 28).

Figure 8:
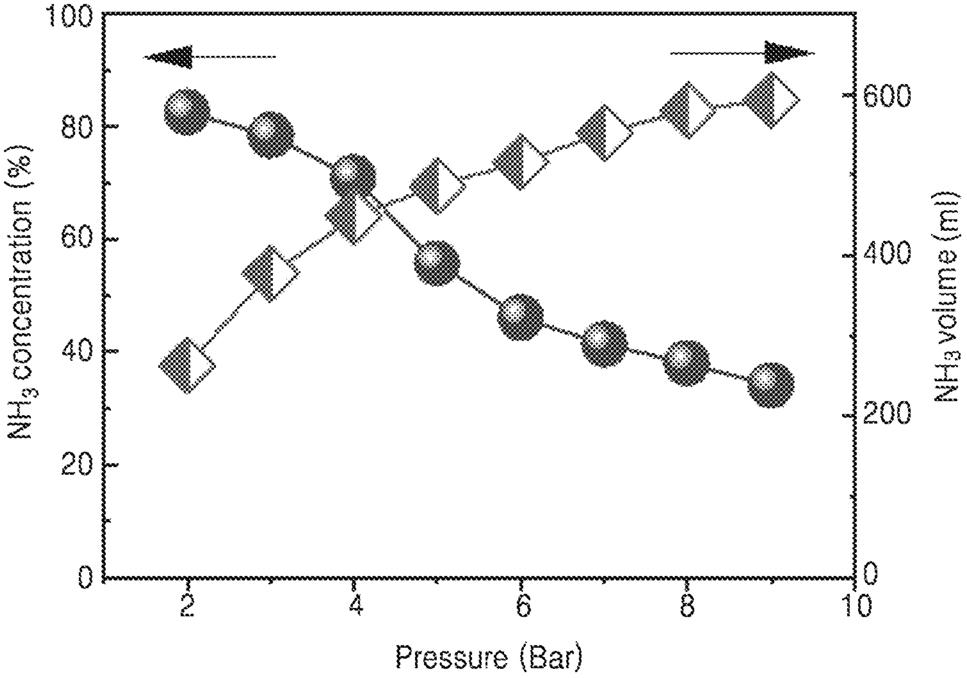
FIG. 8 shows graphs of ammonia volume and ammonia concentration as a function of $H_2$ pressure as measured in Experimental Examples 21 to 28.

FIG. 8 is a graph of the volume of ammonia and the concentration of ammonia as a function of $H_2$ pressure as measured in Experimental Examples 21 to 28. Referring to the graph in FIG. 8, it was found that although the amount of ammonia produced increases with an increasing $H_2$ pressure, the ammonia concentration decreases as the $H_2$ concentration increases.

Ammonia Measurement

Figure 9A:
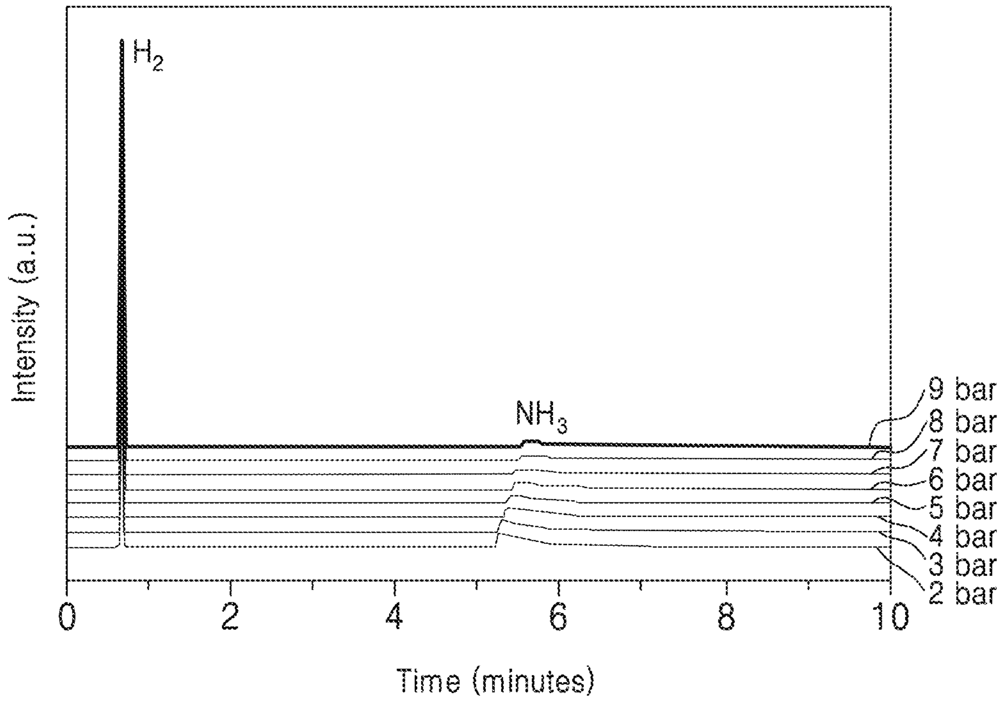
FIG. 9A shows the GC spectra of Experimental Examples 21 to 28.
Figure 9B:
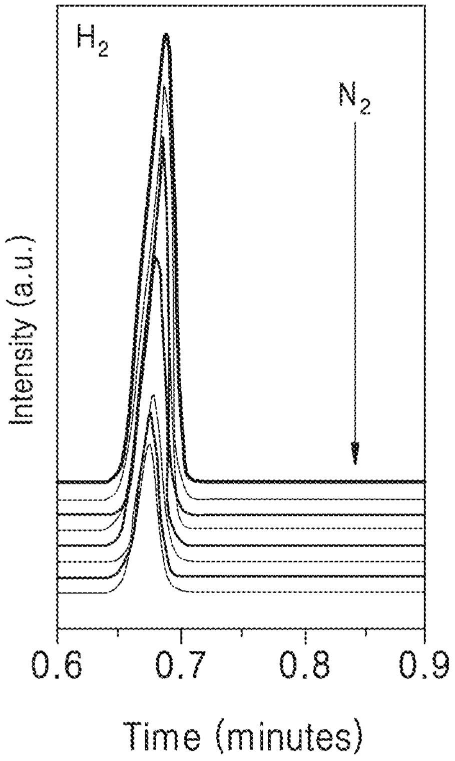
FIG. 9B is the GC spectrum for time window with $H_2$ peaks.
Figure 9C:
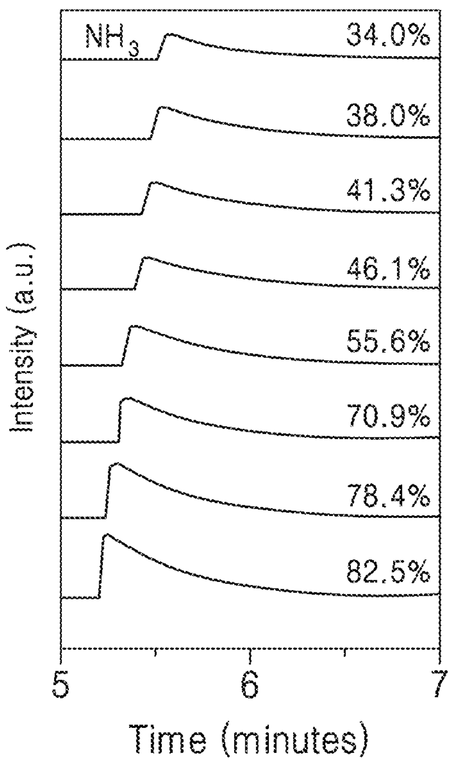
FIG. 9C is the GC spectrum for time window with ammonia peaks.

FIG. 9A shows the GC spectra of Experimental Examples 21 to 28, FIG. 9B is the GC spectra for time window with $H_2$ peaks, and FIG. 9C is the GC spectra for time window with ammonia peaks. Referring to FIGS. 9A to 9C, it was found that as the pressure of hydrogen ($H_2$) increases from 1 bar to 9 bar, the intensity of ammonia ($NH_3$) peak also increases. Also, the absence of $N_2$ peak at the point at which the $N_2$ peak is expected to appear (0.845 minutes) is interpreted that during the process of ammonia synthesis, all nitrogen radicals are consumed as ammonia without being transformed to $N_2$.

Stability Measurement

Experimental Example 29

Fe(N*) particles were prepared by ball-milling Fe particles under $N_2$ (9 bar) at a rotation speed of 400 rpm for 10 hours. Subsequently, the prepared Fe(N*) particles were hydrogenated by ball milling at a rotation speed of 500 rpm under $H_2$ (9 bar) for 4 hours, to produce ammonia. The above process was repeated 9 times.

Figure 10:
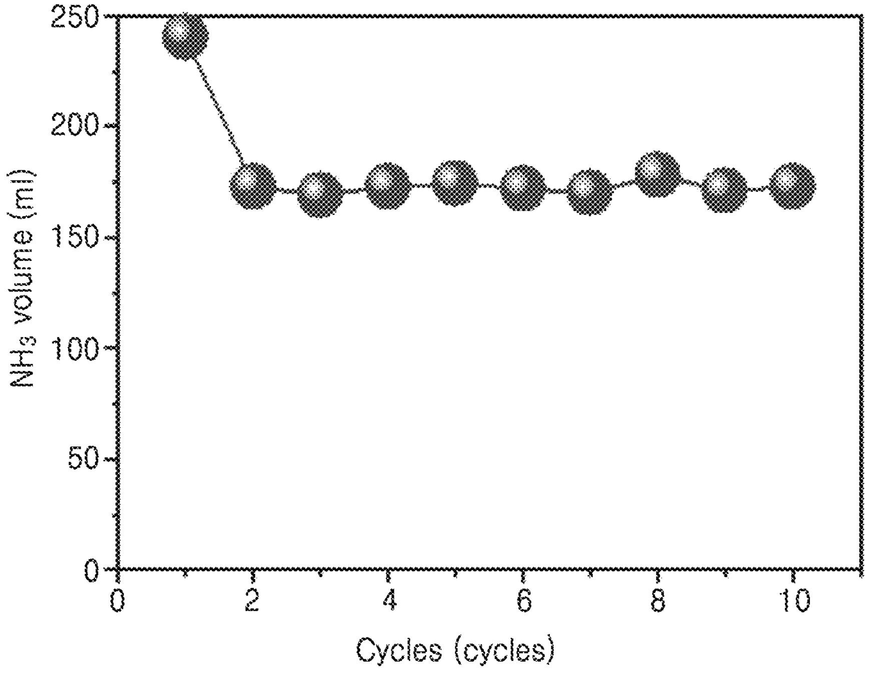
FIG. 10 is a graph showing the volume of ammonia produced in Experimental Example 29 as a function of the number of cycles repeated.

FIG. 10 is a graph showing the volume of ammonia produced in Experimental Example 29 as a function of cycle number. Referring to FIG. 10, although the volume of ammonia produced from the second cycle and onwards is less than that of the first cycle, a fixed amount of ammonia is produced from the second cycle and onwards, demonstrating stability of the production of ammonia according to the present embodiment.

Characterization of Fe Particles

In a step scan mode, X-ray diffraction (XRD) pattern analysis was performed using D/max 2500V (Rigaku, Japan) using Cu-Kα radiation (λ=1.5418 Å). In the step scan mode, the step was 0.02° and the accumulation time was 6 seconds. The scan window was in a range of 30-90°. Extended X-ray absorption fine structure (EXAFS) was collected in transmission mode at the 6D UN IST-PAL beamline of Pohang Accelerator Laboratory (South Korea). The collected data were analyzed using the Athena software. X-ray photoelectron spectra (XPS) were measured on a Thermo Fisher K-alpha XPS spectrometer.

Figure 11:
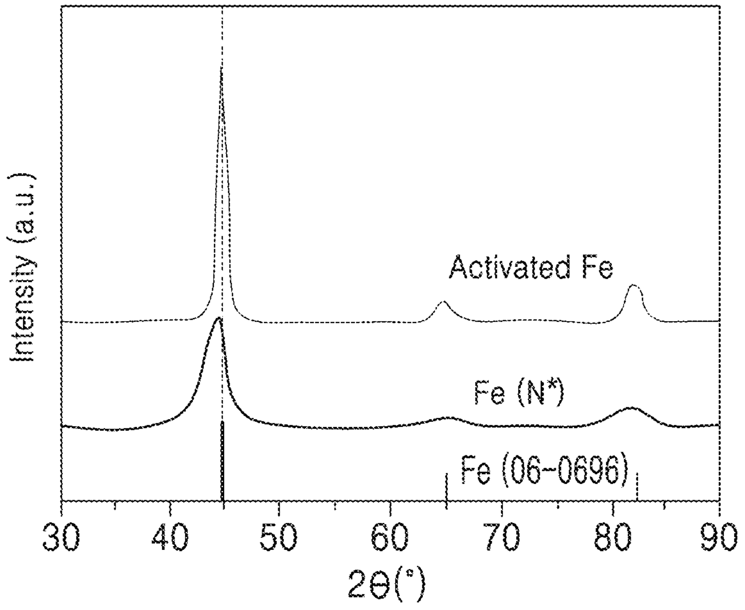
FIG. 11 is a graph showing XRD patterns of activated Fe particles and Fe(N*) particles.

FIG. 11 is a graph showing XRD patterns of activated Fe particles and Fe(N*) particles. Activated Fe particles refer to Fe particles capable of adsorbing and dissociating nitrogen ($N_2$), and Fe(N*) particles refer to Fe particles having dissociated nitrogen atoms (N*) adsorbed thereon. The XRD graph in FIG. 11 shows that compared to the peak of activated Fe particles, the peak of Fe(N*) particles around 45° shows a shift in a lower angle and a broadened peak width. This is attributed to an increasing distance between Fe atoms due to interactions between $N_2$ molecules and Fe atoms as $N_2$ molecules are adsorbed on the Fe particles.

Figure 12A:
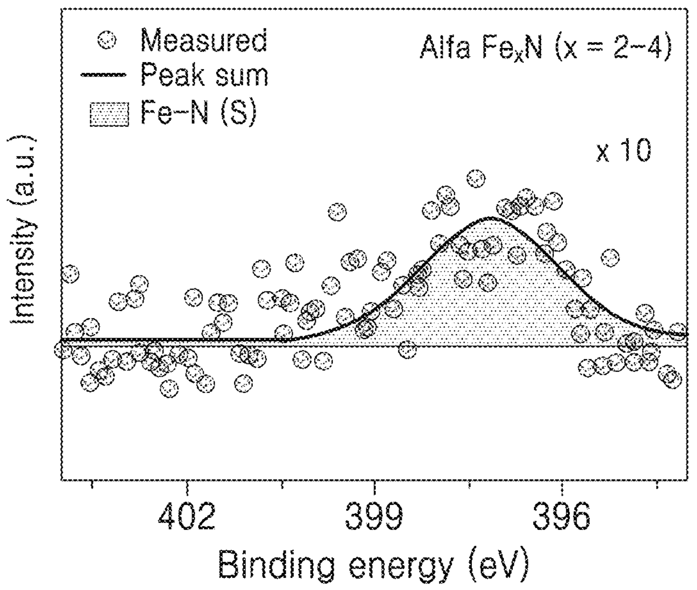
FIG. 12A is an XPS graph of commercially available $Fe_xN$ particles.
Figure 12B:
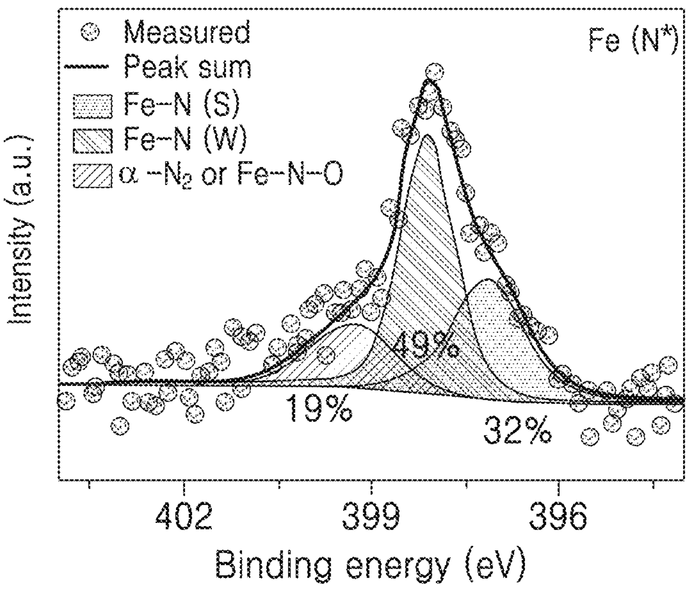
FIG. 12B is an XPS graph of Fe(N*) particles.

FIG. 12A is an XPS graph of commercially available $Fe_xN$ particles, and FIG. 12B is an XPS graph of Fe(N*) particles. Referring to FIG. 12A, the commercially available $Fe_xN$ particles show a single peak at 397.15 eV, and this is attributed to the Fe—N bonding in $Fe_4N$. Meanwhile, as shown in FIG. 12B, Fe(N*) particles show additional peaks at 398.10 eV and 399.30 eV. It is considered that these peaks are attributed to high N concentrations on the surface of Fe particles and the subsequently weakened Fe—N bonding.

The invention claimed is:

1. A mechanochemical ammonia synthesis method, comprising:

(a) performing first ball-milling on Fe particles with balls in a nitrogen ($N_2$) atmosphere; and (b) performing second ball-milling on the first ball-milled Fe particles with balls under a hydrogen ($H_2$) atmosphere.

2. The mechanochemical ammonia synthesis method of claim 1, wherein in the step (a), collisions with the balls create, on the Fe particles, active defects providing sites allowing nitrogen ($N_2$) to be adsorbed and dissociated into nitrogen atoms (N*).

3. The mechanochemical ammonia synthesis method of claim 2, wherein in the step (a), Fe (N*) particles having nitrogen atoms (N*) adsorbed at the active defects are formed.

4. The mechanochemical ammonia synthesis method of claim 3, wherein the nitrogen atoms (N*) adsorbed on the Fe particles in the step (a) are hydrogenated in the step (b) to produce NH* or $NH_2$* intermediates, or ammonia ($NH_3$).

5. The mechanochemical ammonia synthesis method of claim 4, wherein the step (b) is repeated until all of the NH* or $NH_2$* intermediates are converted to ammonia.

6. The mechanochemical ammonia synthesis method of claim 1, wherein by the first ball milling, a density of the active defects on the Fe particles increases.

7. The mechanochemical ammonia synthesis method of claim 1, wherein the step (a) is conducted at a temperature in a range of 20° C. to 100° C.

8. The mechanochemical ammonia synthesis method of claim 1, wherein the step (a) is conducted at a pressure in a range of 1 bar to 20 bars.

9. The mechanochemical ammonia synthesis method of claim 1, wherein the first and second ball-milling are conducted in a ball-milling container, and in the step (a), the first ball milling is conducted at a rotation speed of the ball-milling container, in a range of 200 rpm to 1,000 rpm.

10. The mechanochemical ammonia synthesis method of claim 1, further comprising, between the step (a) and the step (b), a step of converting the nitrogen ($N_2$) atmosphere to the hydrogen ($H_2$) atmosphere.

11. The mechanochemical ammonia synthesis method of claim 1, wherein the step (b) is conducted at a temperature in a range of 40° C. to 100° C.

12. The mechanochemical ammonia synthesis method of claim 1, wherein the step (b) is conducted at a pressure in a range of 1 bar to 20 bars.

13. The mechanochemical ammonia synthesis method of claim 1, wherein the first and second ball-milling are conducted within a ball-milling container, and in the step (b), the ball milling is conducted at a rotation speed of the ball-milling container, in a range of 200 rpm to 1,000 rpm.

14. The mechanochemical ammonia synthesis method of claim 1, wherein the balls are Fe-containing balls.

15. The mechanochemical ammonia synthesis method of claim 1, wherein in the step (a), the Fe particles have a diameter in a range of 10 nm to 100 μm.

16. The mechanochemical ammonia synthesis method of claim 3, wherein in the step (b), the Fe (N*) particles have a diameter smaller than a diameter of the Fe particles.

17. The mechanochemical ammonia synthesis method of claim 1, further comprising step (c) of separating ammonia produced, after the step (b).

18. The mechanochemical ammonia synthesis method of claim 17, wherein the Fe particles after the step (c) grow to larger particles by Ostwald ripening.

19. The mechanochemical ammonia synthesis method of claim 17, wherein the step (a) and the step (b) are repeated reusing the Fe particles regenerated after the step (c).

* * * * *